United States Patent [19]
Wenstrom

[11] 3,855,668
[45] Dec. 24, 1974

[54] APPARATUS FOR SEPARATING EDIBLE CRAB MEAT FROM NON-EDIBLE PORTIONS OF COOKED CRABS

[75] Inventor: Richard T. Wenstrom, Hampton, Va.

[73] Assignee: Sea Savory, Inc., Cambridge, Md.

[22] Filed: Jan. 10, 1973

[21] Appl. No.: 322,385

[52] U.S. Cl. .................................................. 17/71
[51] Int. Cl. ......................................... A22c 29/00
[58] Field of Search............................. 17/48, 71, 73

[56] References Cited
UNITED STATES PATENTS

| | | | |
|---|---|---|---|
| 2,915,781 | 12/1959 | Woolf et al. | 17/71 |
| 3,375,547 | 4/1968 | Reinke | 17/71 |
| 3,750,234 | 8/1973 | Hunt et al. | 17/71 |

Primary Examiner—Robert Peshock
Attorney, Agent, or Firm—Scrivener Parker Scrivener & Clarke

[57] ABSTRACT

Apparatus and method are disclosed for separating meat particles of a predetermined size from a whole or debacked cooked crustacean, such as a crab, by vibratory motion. The apparatus includes a housing comprising an elongated, open-ended chamber having a pair of opposed horizontally spaced walls spaced 1½ to 4 inches apart and a pair of opposed vertically spaced side walls joining the longitudinal edges of the horizontal walls, the vertical walls being spaced approximately 12 inches apart. A plurality of discharge openings ⅝ to 1⅛ inches in diameter are provided in the bottom wall and means are provided for vibrating the housing at a frequency of 700 to 1,700 cycles per minute at an amplitude of ½ to 1½ inches. When introduced into the chamber, the crustacean body is vibrated with relatively violent impacting force between the chamber walls to separate meat particles therefrom. The method includes the step of vibrating the crustacean at a predetermined frequency between opposed walls having discharge openings and the step of collecting the meat particles that pass outwardly through the discharge openings.

1 Claim, 3 Drawing Figures

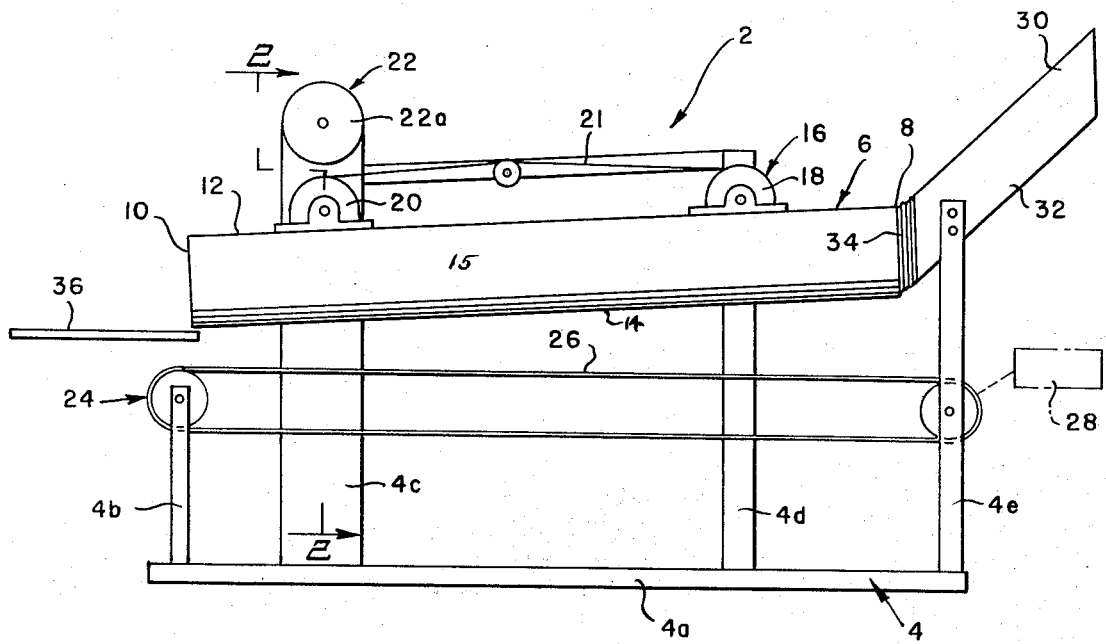
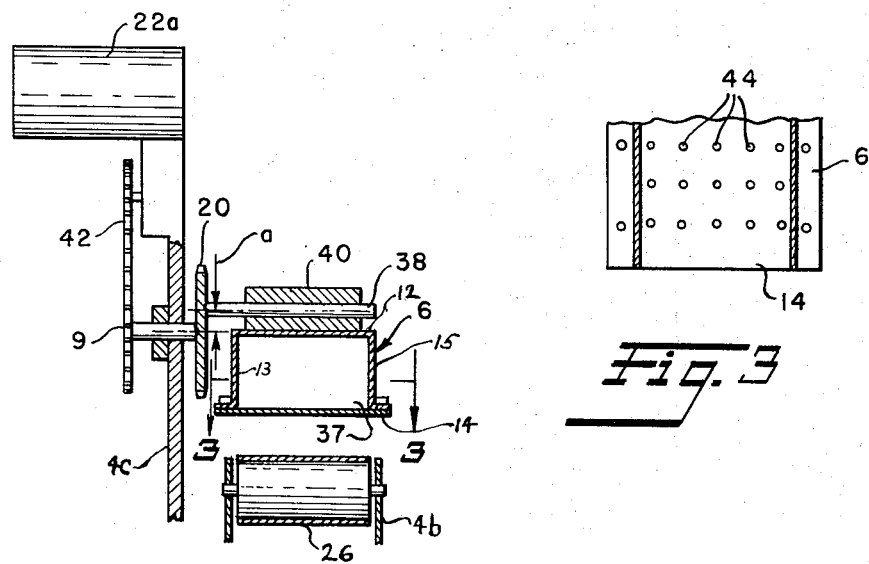

APPARATUS FOR SEPARATING EDIBLE CRAB MEAT FROM NON-EDIBLE PORTIONS OF COOKED CRABS

BACKGROUND OF THE INVENTION

1. Field of the Invention

This invention relates generally to a method and apparatus for mechanically separating the edible meat from the bodies of whole or debacked crustaceans.

2. Prior Art

An economical and efficient method for automatically removing the edible meat from crustaceans such as crabs has long been sought by food processors. One apparatus, disclosed in U.S. Pat. No. 2,879,538 issued Mar. 31, 1959 to Peuss, relates to a shelling tool in the form of wing-shaped throwing and beating arms which are mounted for rotation within a rotatable drum, whereby the shells of the crustaceans such as crabs, shrimps or the like are cracked and loosened by repeated blows of the tools. A major problem with this type of apparatus is to avoid crushing the separated meat particles and to reduce formation of shell fragments that would otherwise be mixed with the meat particles. To assist in overcoming such drawbacks, an improved apparatus for automatically removing the meat from crabs was developed as disclosed in U.S. Pat. No. 3,375,547 issued on Apr. 2, 1968 to Reinke, wherein apparatus is disclosed including a rotating tubular drum and counter rotating radial blades having free ends bent in the rearward direction relative to the direction of rotation of the blades to improve the jarring or tumbling forces imparted to the crab particles. While such apparatus is well suited for the purposes intended, the need to provide even more efficient separation of meat particles having a more uniform size and at a lower cost still exists. More particularly, no apparatus has yet been disclosed which automatically and efficiently separates meat particles of uniform size from a crustacean body such as a crab.

The use of vibrational motion for purposes of separating and classifying materials is generally well known as evidenced by U.S. Pat. No. 3,314,539 issued to Hitchman on Apr. 18, 1967, which discloses vibrating screen apparatus for separating particulate material into fractions of different sizes. Furthermore, it is known to separate materials within a vibrating structure such as a rectangular box by means of a shaft and counter balance weight as disclosed in U.S. Pat. No. 529,872 issued Nov. 27, 1894 to Morse. However, no process or apparatus for automatically removing meat from crustaceans such as crabs by means of vibratory motion has been disclosed heretofore.

SUMMARY OF THE INVENTION

It is a general object of this invention to disclose a method and apparatus for efficiently separating meat particles of a predetermined size from a whole or debacked cooked crustacean body by means of vibratory motion.

It is another object of this invention to provide a method and apparatus for separating meat particles of a predetermined size from a whole or debacked cooked crustacean body which is effective to break up the crustacean body into its component parts without crushing the crustacean meat.

It is a more specific object of this invention to provide an apparatus for separating meat particles of a predetermined size from a whole or debacked cooked crustacean including a frame, and a housing connected with the frame for vibratory motion including a pair of opposed spaced walls for impacting the crustacean as the housing is vibrated. The housing contains an inlet opening for receiving a crustacean body and an outlet opening and also contains a plurality of discharge openings equal to the desired size of the meat particles. In addition, the disclosed apparatus includes means connecting the housing with the frame for vibratory motion in a direction normal to the chamber walls with a preselected amplitude of vibration and means for vibrating the housing relative to the frame at a frequency of oscillation greater than 700 cycles per minute, whereby a crustacean body introduced into the chamber through the inlet opening will be vibrated with relatively violent impacting force between said chamber walls to separate meat particles from the crustacean body. Finally, means are provided for collecting the meat particles that are discharged from the housing through the discharge openings.

Still another object of this invention is to provide a method and apparatus for separating the meat components from crustaceans including a housing having discharge openings 5/8 inch to 1 1/8 inch in diameter wherein the housing is vibrated at a frequency of 700 to 1,700 cycles per minute with an amplitude of 1/2 inch to 1 1/2 inch and wherein opposed horizontal walls of the housing are spaced from 1 1/2 inch to 4 inches and the opposed vertical walls are spaced approximately 12 inches apart.

Yet another object of this invention is to provide apparatus for separating the meat from a crustacean body including means for collecting the remaining portions of the crustacean body discharged from the chamber.

Still another object of this invention is to provide apparatus for separating meat particles of a predetermined size from a whole or debacked cooked crustacean wherein inlet and outlet openings are arranged at opposite sides of the housing and wherein the chamber walls are generally planar, vertically spaced and slightly inclined to the horizontal and further wherein the outlet opening is at a lower elevation than the inlet opening whereby the crab body is transported by gravity from the inlet opening through the housing and out of the outlet opening as the housing is vibrated.

A further object of this invention is to provide an apparatus for separating meat particles of a predetermined size from a whole or debacked cooked crustacean wherein the vibrating means includes a pair of eccentrics rotatably connected with the frame. Each eccentric includes an output shaft eccentrically spaced from the rotational axis of the eccentric, journal means rotatably connecting the output shaft with the housing and drive means for synchronously rotating the pair of eccentrics to vibrate the housing. The output shaft of each eccentric is offset from the rotational axis of the eccentric by a distance greater than 1/4 inch but less than 3/4 inch.

A still further object of this invention is to provide a method for separating meat particles of a predetermined size from a whole or debacked cooked crustacean body including the steps of introducing the crab between a pair of opposed surfaces, causing the crab body to be transported transversely in opposite directions between and in violent impacting engagement with, the opposed surfaces at a frequency of from 700 to 1,700 oscillations per minute, thereby to vibrate meat particles out of the crab body and collecting the meat particles that pass outwardly through the discharge openings.

The foregoing and other objects and advantages of the present invention will appear from the following detailed description.

BRIEF SUMMARY OF THE DRAWING

FIG. 1 is a side elevational view of a crustacean separating apparatus arranged in accordance with the subject invention;

FIG. 2 is a partial cross-sectional view of the crustacean separating apparatus of FIG. 1 taken along lines 2—2 of FIG. 1; and FIG. 3 is a partial cross-sectional view of the crustacean separating apparatus of FIG. 2 taken along lines 3—3.

DETAILED DESCRIPTION OF THE PREFERRED EMBODIMENT

With reference to FIG. 1, a crustacean separating apparatus 2 is disclosed in accordance with this invention including a frame 4 having base 4a and upright supports 4b, 4c, 4d and 4e and a housing 6 having a generally rectangular cross section for receiving the crustaceans to be separated. The housing is provided with inlet opening 8 and outlet opening 10 at opposite ends of the housing. The inlet and outlet openings communicate with an interior chamber formed by a pair of opposed, generally planar, vertically spaced walls 13 and 15 joined at the longitudinal edge thereof by a pair of opposed, generally planar, horizontally spaced walls 12 and 14. The bottom wall of the chamber is provided with a plurality of discharge openings for permitting meat particles of predetermined size to be discharged from the chamber. The outlet opening 10 is at a lower elevation than the inlet opening 8, whereby the remaining portions of the crustacean body (after removal of substantially all the meat) may be transported by gravity out of the housing chamber through outlet opening 10.

Connecting means 16 are provided for connecting the housing 6 with upright supports 4c and 4d of frame 4 for vibrating motion transverse to the opposed chamber walls 12, 13, 14 and 15. The connecting means 16 includes a pair of eccentrics 18 and 20 connected by chain 21 for synchronous rotational motion. Eccentrics 18 and 20 will be described in greater detail with respect to FIG. 2.

To vibrate the housing 6 relative to the frame 4, drive means 22 are provided including an electric motor 22a which rotates the eccentrics at a speed sufficient to vibrate the housing at a frequency between 700 and 1,700 cycles per minute. Collecting means 24 are also provided in the form of a conveyor belt 26 rotatably connected with upright supports 4b and 4e of frame 4 for receiving the meat particles discharged from the housing as the housing is vibrated. Driving means 28 are provided for moving the conveyor belt.

Input means 30 connected with the frame permit introduction of whole or debacked crustacean bodies into the chamber of housing 6 through inlet opening 8 and prevent crustacean particles from being expelled through the inlet opening while the housing is being vibrated. Input means 30 include an inclined chute 32 secured to the upper extremity of upright support 4e and a flexible membrane 34 connecting the lower end of the inclined chute with the inlet opening.

Adjacent outlet opening 10 of the housing 6 are means 36 for collecting the remaining portions of the crustacean body discharged from the housing chamber through the outlet opening 10. Collecting means 36 may merely include a tray positioned to receive the remaining body portions discharged by gravity feed from outlet opening 20.

As illustrated more clearly in FIG. 2, housing 6 contains a chamber 37 and eccentric 20 includes an output shaft 38 having a central axis offset from the rotational axis of the eccentric by a distance $a$. Output shaft 38 is journalled in a bearing support 40 directly connected to housing 6. Accordingly, the amplitude of vibration of housing 6 is equal to $2a$. Electric motor 22a, illustrated in FIG. 2, is drivingly connected with eccentric 20 by means of a chain 42 for providing the rotational energy necessary to vibrate housing 6.

Referring now to FIG. 3, the bottom wall portion of housing 6 contains a plurality of discharge openings 44 having a diameter equal to the desired predetermined size of the meat particles to be removed from crustaceans.

Operation of the disclosed apparatus is dependent upon a number of critical variables determined by the type of crustacean being processed and the desired size of the meat particles. When processing crabs, the speed of rotation of eccentrics 18 and 20 is preferably approximately 1,200 cycles per minute but may vary between 700 and 1,700 cycles per minute. Furthermore, the offset distance $a$ of the eccentrics is preferably ½ inch, but may vary between one-fourth and three-fourths of an inch, thereby resulting in an amplitude of vibration varying between ½ and 1½ inch. Experimental testing of the disclosed apparatus has also shown that the vertical spacing between opposed walls 12 and 14 of housing 6 is preferably 3 inches but may vary between 1½ and 4 inches. Of particular importance is the size of discharge openings 44 which ideally are approximately 13/16 of an inch in diameter although ⅝ inch to 1⅛ inch diameter is acceptable. The overall width and length of the disclosed housing 6 has been found not to be critical to the operation of the subject invention and, accordingly, may be varied to meet the particular needs of the user.

In operation, whole or debacked crustaceans, such as crabs, are inserted into chute 32 and are fed from there through inlet opening 8 of housing 6 where vibration of the housing by the motor 22a and eccentrics 18 and 20 results in the crab body being vibrated with relatively violent impacting force between chamber walls 12, 13, 14 and 15 to separate the meat particles from the crustacean body. Particles equal to or less than the size of discharge openings 44, accordingly, are permitted to pass onto conveyor belt 26 powered by driving means 28 which deposits the separated meat particles at one end of the belt. When crabs are being processed, small bone particles may be separated from the crab body. However, experience has demonstrated that such small bone particles are almost always separated completely from the meat and may be easily removed either automatically or by hand. Due to the slightly inclined orientation of opposed walls 12 and 14, the crab body is fed by gravity toward outlet opening 10 and is discharged from the housing chamber into output means 36 adapted to receive the remaining portions of the crab body.

Apart from the disclosed apparatus, the subject invention is also directed to a method for separating meat particles of a predetermined size from a whole or debacked crustacean body such as a crab. This method includes the steps of introducing the crab body into an elongated closed chamber as heretofore described, at least one of said surfaces of the chamber containing a plurality of discharge openings having diameters of from ⅝ inch to 1⅛ inch. Thereafter, the crab body is caused to be transported transversely in opposite directions between and in violent impacting engagement with the opposed surfaces at a frequency of from 700 to 1,700 oscillations per minute, thereby to vibrate the meat particles out of and to separate relatively small bone particles from the crab body. After discharge of the meat particles, the meat is collected at a single location. The method also includes the step of removing from between the parallel surfaces the remaining portions of the crab body. It has been found, as noted above, that the method is most efficient when the amplitude of vibration ranges between ½ and 1½ inches and is ideally approximately 1 inch.

An apparatus and method has been disclosed wherein meat particles of a predetermined size are separated from a whole or debacked precooked crustacean body, such as a crab, by application of vibratory motion to the crustacean body. The vibratory motion is applied with sufficient force and frequency to cause the meat to be separated from the body and for the meat particles to be discharged having a predetermined size without being crushed or reduced to a mush-like consistency. To accomplish this, a number of critical variables have been delineated including acceptable ranges of values within which satisfactory results may be obtained. The recited values of frequency, amplitude and spacing have been found to be particularly critical to the efficient practice of the disclosed method and apparatus.

I claim:

1. Apparatus for separating meat particles of a predetermined size from a whole or debacked cooked crustacean, comprising
    a. a frame (4);
    b. a housing (6) comprising spaced apart side walls (13, 15) and spaced apart top and bottom walls (12, 14), said walls defining an elongated rectangularly shaped, open-ended chamber, said housing containing an inlet opening for receiving a crustacean body and an outlet opening for receiving a crustacean body, the bottom wall of said chamber containing a plurality of discharge openings equal to the predetermined size of the meat particles;
    c. means (16) connecting said housing with said frame for vibratory motion in a direction normal to said chamber walls with a pre-selected amplitude of vibration;
    d. means (22) vibrating said housing relative to said frame at a frequency of oscillation greater than 700 cycles but less than 1,700 cycles at an amplitude of vibration of ½ to 1½ inches, per minute, whereby a crustacean body introduced into said chamber through said inlet opening will be vibrated with relatively violent impacting force between said chamber walls to separate meat particles from the crustacean body; and
    e. means (24) for collecting the meat particles that are discharged from said housing through said discharge openings; and means (36) for collecting the remaining portions of the crustacean body discharged from said chamber through said outlet opening.

* * * * *